C. J. HOLSLAG.
ELECTRIC ARC PERFORATING, CUTTING, OR REDUCING ELECTRODE.
APPLICATION FILED MAR. 3, 1919
1,321,309.
Patented Nov. 11, 1919.
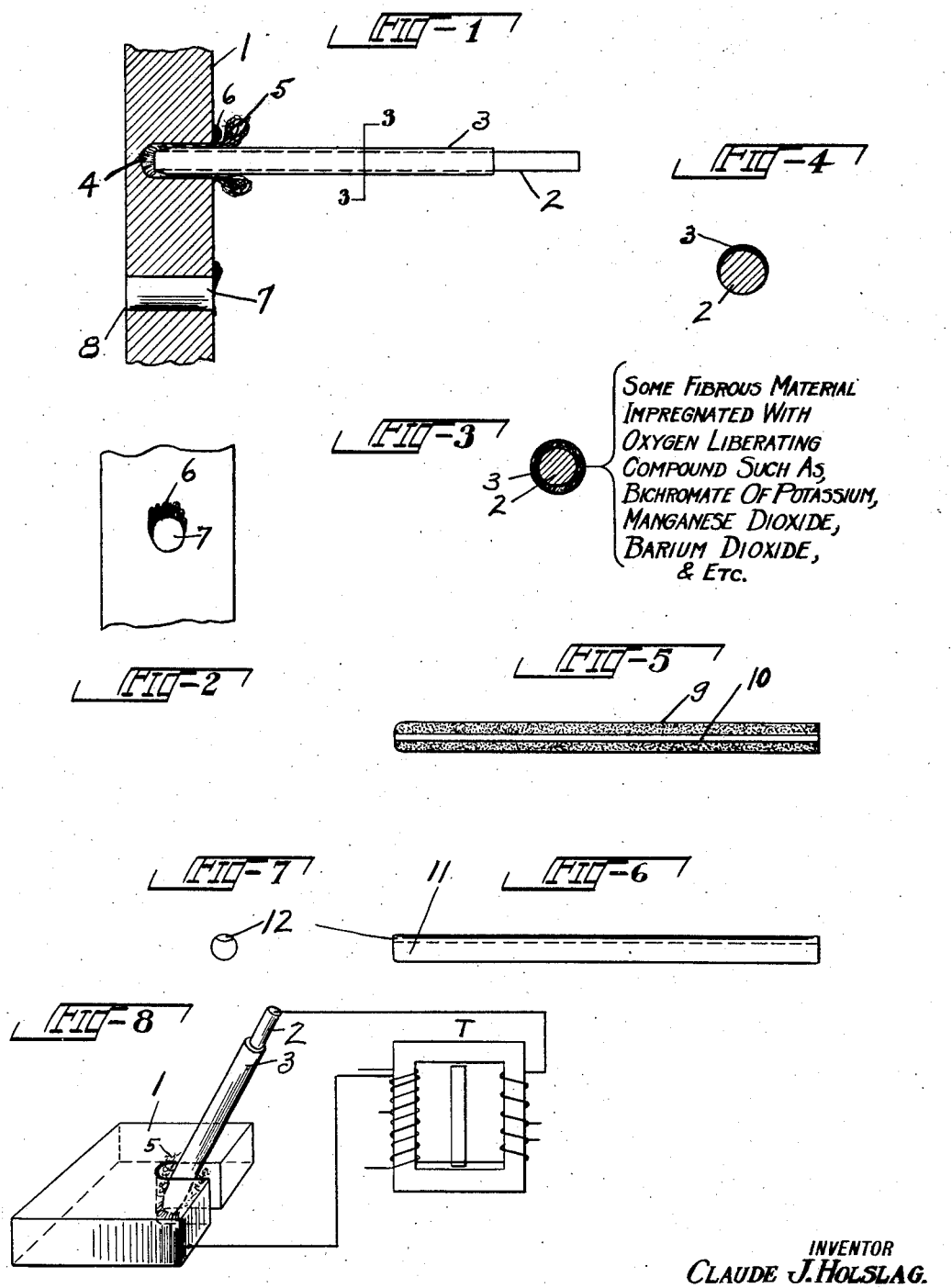
INVENTOR
CLAUDE J. HOLSLAG.
BY
Albion D. T. Libby
ATTORNEY

UNITED STATES PATENT OFFICE.

CLAUDE J. HOLSLAG, OF SOUTH ORANGE, NEW JERSEY.

ELECTRIC-ARC PERFORATING, CUTTING, OR REDUCING ELECTRODE.

1,321,309.  Specification of Letters Patent.  Patented Nov. 11, 1919.

Application filed March 3, 1919. Serial No. 280,349.

*To all whom it may concern:*

Be it known that I, CLAUDE J. HOLSLAG, a citizen of the United States, residing at South Orange, in the county of Essex and State of New Jersey, have invented certain new and useful Improvements in Electric-Arc Perforating, Cutting, or Reducing Electrodes, of which the following is a specification.

This invention relates to an electrode to be used in connection with an electric arc for perforating metal plates or cutting or reducing metals of any character and by way of illustration, but not limitation, I have shown the electrode used in connection with a source of alternating current, such as a transformer similar to that shown in my copending application, Serial No. 239,447, filed June 11, 1918. In the process of electric arc welding and repairing in which metallic electrodes are used, I have found that the best welds are obtained by applying to the welding or repairing electrode a very thin coating which contains a material having a great affinity for oxygen, such as magnesium, boron, ferro-titanium, etc., whereby the oxygen of the air or from the metal being welded or repaired is rapidly taken up whereby a homogeneous and strong weld is obtained, all of which is pointed out in my co-pending application, Serial No. 258,197, filed October 15, 1918. In this aforesaid mentioned application, I have pointed out that slag covered electrodes are detrimental to good welding for the reason that the slag gets mixed in with the molten metal and a porous weld is the result. Heretofore for welding purposes electrodes having many different types of slag coatings have been used and a number of these have been designed with material to give a reducing action, which reducing action for welding is not the proper thing.

Coming now to the question of perforating, cutting or reducing, a strong oxidizing effect is required and I, therefore, apply in some manner to the electrode used, a coating which carries a compound that readily liberates oxygen under the heat of the arc, or I may feed air or oxygen in some suitable manner to the end of the electrode from which the arc is operating. I have discovered that a steel electrode covered according to my invention can be pushed straight through a half inch steel plate in about three seconds time leaving an almost circular hole but slightly larger than the electrode itself and entirely clean on one side. It is to be understood that this same type of an electrode is suitable for cutting as well as perforating.

From what has been said it will be understood that the general object of this invention is to provide an electrode for perforating, cutting or reducing which will do this work faster and better than electrodes heretofore used for the purposes mentioned.

In the drawing, Figure 1 is a view of one form of my electrode used for perforating a metal plate.

Fig. 2 is a plan view of a section of the plate shown in Fig. 1.

Fig. 3 is an enlarged sectional view on the line 3—3 of Fig. 1.

Fig. 4 is an enlarged view of an electrode having only a partial coating.

Fig. 5 is a view of the modified form of an electrode adapted for certain purposes.

Fig. 6 is still another form of electrode, while

Fig. 7 is an end view of the electrode shown in Fig. 6.

Fig. 8 shows an electrode connected to a special transformer T for the purpose of cutting.

As illustrated in Fig. 1, an electrode 2 having a covering 3 is shown as entering the plate 1, the arc being formed at the point 4. As the metal both from the plate 1 and electrode 2 is melted under the heat of the arc and the reducing action of liberated oxygen forming gaseous vapors which are driven out around the electrode as indicated at 5, a little of the molten metal condensing, is deposited at the edge of the hole as at 6. When the hole is finished it looks about the same as that illustrated at 7, a small amount of metal being thrown up usually on one side of the hole as at 6, while the hole at the back side of the plate 8 is relatively smooth. The covering 3 may be of any fibrous material, such as asbestos which is impregnated with some oxygen liberating compound such as bichromate of potassium, manganese-di-oxid, barium-di-oxid, potassium permanganate, potassium chlorate, etc. I preferably use with these oxygen liberating compounds some of the ingredients used on my welding electrode, such as silicate of soda and carbonate of calcium, as the silicate of soda helps to bind the fibrous material together and to the electrode body and quiets the reaction while the carbonate of calcium helps to float the impurities out of the melting metal allowing it to gasify quickly. This covering may be put on all the way around the electrode as shown in Fig. 3 or it may be applied to a portion of the surface, as shown in Fig. 4, for special purposes. In Fig. 5, I have shown a carbon or graphite electrode 9 having a hole 10 that is adapted to be filled with an oxygen liberating compound, or oxygen from any source may be fed through the hole 10 to the arc.

In Fig. 6, I have shown an electrode 11 having a groove 12 within which the oxygen liberating compound is placed; however, for many classes of work I prefer to use a steel electrode of suitable composition and cover this as shown in Figs. 1 and 3.

When either of the electrodes above described is used for cutting purposes, as shown in Fig. 8, the cut is started at the edge of the metal and as this is melted that which does not go off in gas drops down through the bottom of the slot and is of course not deposited on the work the same as in the boring operation.

The oxygen carried by the electrode in any of the forms above described or in any other suitable manner, is quickly liberated under the heat of the arc and combines with the metal liquefying the same and carrying a considerable portion off as a gas whereby perforating or boring with the electrode itself is produced in a highly satisfactory manner. As pointed out, the principles involved in boring or cutting are quite the reverse of welding and are therefore not to be confused with those of welding as I have found them.

While I have shown certain forms of electrodes for carrying my invention into practice, I do not wish to be limited to the exact details shown and described, as a number of changes will suggest themselves to one skilled in the art.

Having thus described my invention, what I claim is:

1. An electrode for use in electric arc perforating, cutting or reducing, comprising a material arranged to carry a compound adapted under the heat of the arc to give up freely oxygen to the metal that is to be perforated, cut or reduced for the purpose described.

2. An electrode for use in electric arc perforating, cutting or reducing, comprising a metal rod having a covering of fibrous material carrying a compound adapted under the heat of the arc to give up freely oxygen to the metals, between which the arc is established for the purpose described.

3. An electrode for use in electric arc perforating, cutting and reducing, comprising a metal rod having a covering of fibrous material impregnated with a solution containing a material, such as, bichromate of potassium, barium di-oxid, manganese di-oxid, potassium per-manganate, potassium chlorate, adapted under the heat of the arc to liberate a quantity of oxygen to assist in liquefying and gasifying the metal to be perforated, cut or reduced.

4. An electrode for use in electric arc perforating, cutting or reducing, comprising a metal rod having a covering of fibrous material impregnated with a solution containing silicate of soda and a compound which gives up freely under the heat of the arc a considerable quantity of oxygen to the metal that is to be perforated, or cut.

5. An electrode for use in electric arc perforating, cutting or reducing, comprising a metal rod having a covering of fibrous material impregnated with a solution containing silicate of soda, carbonate of calcium and a compound which gives up freely under the heat of the arc a considerable quantity of oxygen to the metal that is to be perforated or cut.

6. An electrode for use in electric arc cutting and reducing, comprising a metal rod having a partial coating of fibrous material impregnated with a solution containing preferably silicate of soda and a compound adapted under the heat of the arc to liberate an excess of oxygen for the purpose described.

In witness whereof I affix my signature.

CLAUDE J. HOLSLAG.